No. 648,213. Patented Apr. 24, 1900.
F. MEUKERT, Jr.
VEHICLE SHAFT.
(Application filed Dec. 6, 1899.)
(No Model.) 2 Sheets—Sheet 1.

Witnesses:—
Charles B. Mann Jr.
Charles Vietsch.

Inventor:—
Frederick Meukert Jr.
By Chas B. Mann
Attorney.

No. 648,213. Patented Apr. 24, 1900.
F. MEUKERT, Jr.
VEHICLE SHAFT.
(Application filed Dec. 6, 1899.)

(No Model.) 2 Sheets—Sheet 2.

Witnesses:-
Charles B. Mann Jr,
Charles Vietsch.

Inventor:-
Frederick Meukert Jr,
By Chas B. Mann
Attorney.

UNITED STATES PATENT OFFICE.

FREDERICK MEUKERT, JR., OF BALTIMORE, MARYLAND.

VEHICLE-SHAFT.

SPECIFICATION forming part of Letters Patent No. 648,213, dated April 24, 1900.

Application filed December 6, 1899. Serial No. 739,343. (No model.)

*To all whom it may concern:*

Be it known that I, FREDERICK MEUKERT, Jr., a citizen of the United States, residing at Baltimore, in the State of Maryland, have invented certain new and useful Improvements in Vehicle-Shafts, of which the following is a specification.

This invention relates to a novel construction and arrangement for attaching shafts or thills to the front axles of vehicles, whereby the shafts are always maintained in an elevated position.

The object of my invention is to provide shafts that will not require any support from the harness on the horse.

The invention is illustrated in the accompanying drawings, in which—

Figure 1:
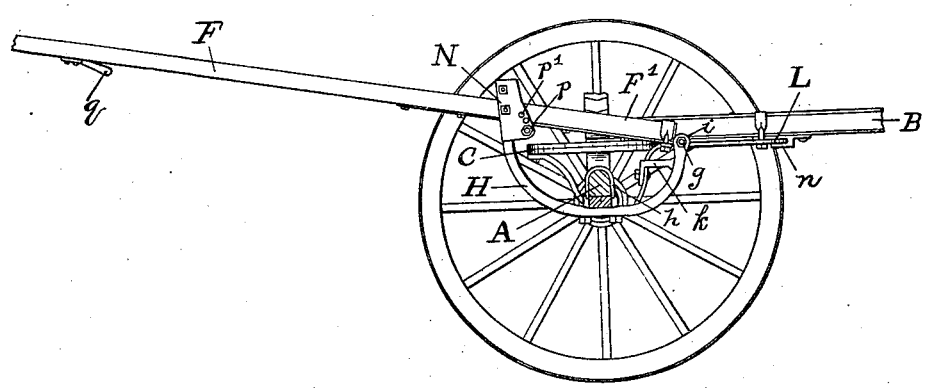
Figure 2:
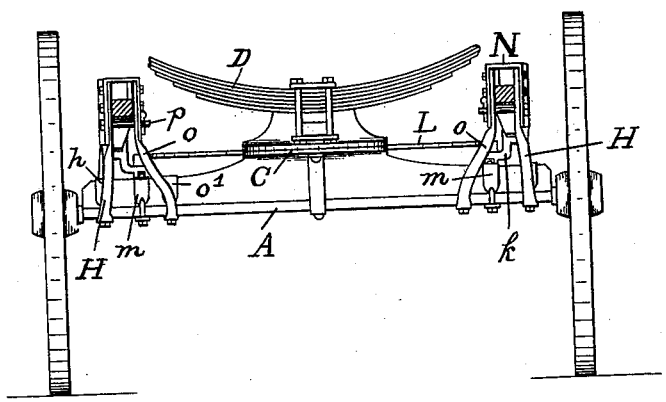
Figure 3:
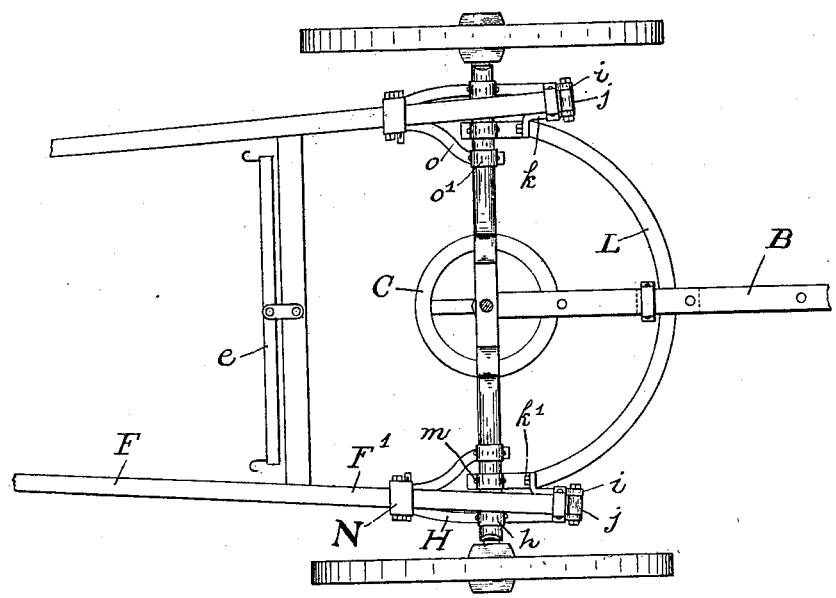
Figure 4:
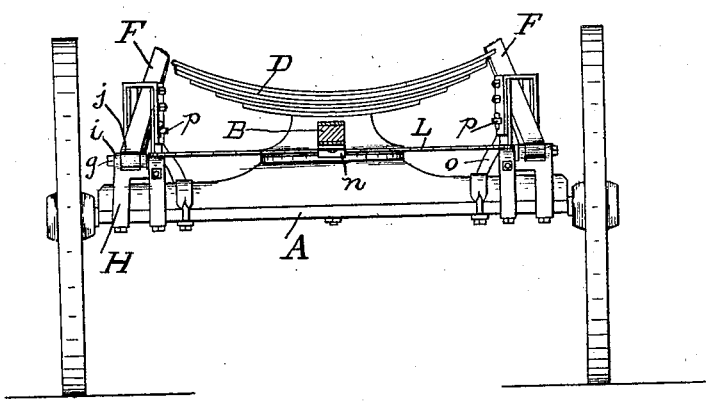

Figure 1 is an elevation of a front wheel, the near wheel being removed, the section being on the line 1 1 of Fig. 3, and shows the shaft connections. Fig. 2 is a front elevation of the front axle and wheels and shaft connections. Fig. 3 is a top view of parts. Fig. 4 is a rear elevation of the front axle, showing the shaft connections.

The letter A designates the front axle of a vehicle, B the reach or perch pole extending between the front and rear axles, (the latter not being shown,) and C an ordinary fifth-wheel. Springs of any suitable kind, such as D, may be used.

The shafts F have a suitable cross-bar and whiffletree $e$; but the rear ends F' of the shafts back of the whiffletree are longer than usual and extend over the front axle A, and their extremities are jointed by the pivot-bolt $g$ to irons at the rear of the axle. Suitable means in front of the axle support the shaft in an elevated position. Each thill or shaft is connected to the axle by a set of irons that will now be described. An inverted-arch-shaped iron H is secured by a clip $h$ to the axle, one end of said iron curving up behind the axle and the other end curving up in front. The rear end of this iron has joint-ears $i$, which receive the joint-tongue $j$ on the extremities of the thill, a pivot-bolt $g$ coupling these joint parts. The rear end of iron H also has an arm $k$, which projects forward laterally and downward and is secured by a bolt $k'$ to a semicircular bar L, whose ends are attached by clips $m$ to the axle. The semicircular bar takes loosely through a guide $n$ on the lower side of the reach B. This bar L contributes stability to the axle connections and prevents the axle from tilting and the king-bolt from bending. Returning now to the inverted-arch-shaped iron H, the front end projects upward into a clip N, where it is secured. The clip serves as a box for the thill, as presently described. A second iron $o$ has one end secured to the axle by a clip $o'$ and projects forward and curves upward into the said box or clip N, where it is secured by bolts or rivets. The clip N has an open bottom. The thill F when raised passes up through the open bottom of the box or clip N and is retained therein by a bolt $p$, the weight of the forward ends of the thill being sustained by said bolt $p$. The sides of the box or clip N have several holes $p'$, into either of which the bolt $p$ may be entered, thereby to vertically adjust the forward end of the thill, so as to make it suit the height of the particular horse that may be harnessed into the thills.

It will now be understood that if the bolts $p$ in the box at each side are removed the forward ends of the shafts or thills F may be lowered until they rest on the ground, the pivot-bolts $g$ permitting this. It will also be understood that when a horse is harnessed into these thills the latter are retained and kept in an elevated position without any support whatever from the harness. The harness of a horse in this vehicle will require no saddle and no shaft-loops or tugs, such as are commonly employed. The only connections of the harness with the shafts or thills are the usual harness-traces connected with the whiffletree $e$ and the usual breech-straps or holdback-straps connected with the loops $q$ on the thills. It will be seen that no shaft-weight comes on the horse's back, and sore backs, therefore, are avoided.

Having thus described my invention, what I claim as new, and desire to secure by Letters Patent, is—

1. The combination of a front axle of a vehicle; irons attached to said axle and projecting both rearward and forward thereof; and shafts extending over the front axle to a point at its rear and which are connected to the rearward-projecting portion and also to the forward-projecting portion of said irons.

2. The combination of a front axle of a vehicle; irons attached to said axle and projecting both rearward and forward thereof; boxes supported by the forward-projecting irons; and shafts or thills which extend over the said axle and are pivoted to the rearward-projecting portion of the irons, and are adjustable in said boxes on the forward-projecting irons.

3. The combination of the front axle of a vehicle; inverted-arch-shaped irons secured to the axle and having their back ends curving up behind and the other ends curving up in front; and shafts whose rear ends extend over said axle and are pivoted to said upcurved back ends and supported by said upcurved ends in front.

4. The combination of the front axle of a vehicle; a reach extending to the rear axle; a semicircular bar, L, whose ends are attached to the front axle and which takes on the lower side of said reach; inverted-arch-shaped irons secured to the axle and having their back ends curving up behind and the other ends curving up in front; and shafts whose rear ends extend over said axle and are pivoted to said upcurved back ends and supported by said upcurved ends in front.

In testimony whereof I affix my signature in the presence of two witnesses.

FREDERICK MEUKERT, Jr.

Witnesses:
CHARLES B. MANN, Jr.,
CHARLES VIETSCH.